(12) United States Patent
Andjelic (10) Patent No.: US 11,629,222 B2
(45) Date of Patent: Apr. 18, 2023

(54) CALORIMETRIC CRYSTALLIZATION METHOD FOR EVALUATION OF MONOMER PURITY

(71) Applicant: Ethicon, Inc., Somerville, NJ (US)

(72) Inventor: Sasa Andjelic, Nanuet, NY (US)

(73) Assignee: Ethicon, Inc., Raritan, NJ (US)

( * ) Notice: Subject to any disclaimer, the term of this patent is extended or adjusted under 35 U.S.C. 154(b) by 960 days.

(21) Appl. No.: 16/458,377

(22) Filed: Jul. 1, 2019

(65) Prior Publication Data

US 2021/0002416 A1 Jan. 7, 2021

(51) Int. Cl.
*C08G 63/08* (2006.01)
*G01N 25/14* (2006.01)
*G01N 25/48* (2006.01)

(52) U.S. Cl.
CPC ............ *C08G 63/08* (2013.01); *G01N 25/14* (2013.01); *G01N 25/4866* (2013.01)

(58) Field of Classification Search
USPC ..................................... 374/16, 33; 528/354
See application file for complete search history.

(56) References Cited

U.S. PATENT DOCUMENTS

| | | | |
|---|---|---|---|
| 5,102,872 A | 4/1992 | Singh | |
| 5,266,706 A | 11/1993 | Bhatia | |
| 6,187,901 B1 | 2/2001 | Koskinen | |
| 8,404,868 B2 | 3/2013 | Yamane | |
| 8,658,758 B2 | 2/2014 | Sato | |
| 2007/0128731 A1* | 6/2007 | Deshmukh | G01N 25/4866 436/147 |
| 2021/0363345 A1* | 11/2021 | Lobera | C08K 5/053 |

FOREIGN PATENT DOCUMENTS

WO    91/17155 A1    11/1991

OTHER PUBLICATIONS

D'Avila, et al., Synthesis and Characterization of Poly(D,L-Lactide-co-Glycolide) Copolymer, Journal of Biomaterials and Nanobiotechnology, 2012, pp. 208-225, vol. 3.
Gokalp, et al., Enzymatic Ring Opening Polymerization of e-Caprolactone by Using a Novel Immobilized Biocatalyst, Adv. Mater. Lett., 2016, pp. 144-149, vol. 7, Issue 2.

* cited by examiner

*Primary Examiner* — Fred M Teskin
(74) *Attorney, Agent, or Firm* — David R. Crichton; Leo B. Kriksunov (57) ABSTRACT

The present invention is directed to devices and methods for monitoring the purity of monomers, adjusting the polymerization conditions, and consequently improving a polymerization reaction process. In one method, monomer purity is estimated using an on-line evaluation by raising the temperature of the monomer formulation having a defined melting point to a first elevated temperature at least 20° C. above a preset melting point for a selected monomer formulation; cooling the monomer formulation at a controlled cooling rate in the range from about 0.5 to 50° C. per minute; measuring at least one critical property selected from the group consisting of a) crystallization peak temperature at the onset of crystallization, b) an area under the crystallization peak, which represents the heat or enthalpy of crystallization, $\Delta Hc$ and combinations thereof, comparing the at least one of the selected critical properties measures relative to such properties for standard setting monomer formulations.

18 Claims, 8 Drawing Sheets

An Example of Calorimetric Crystallization Method, Evaluation of Major Crystallization Parameters on Glycolide Monomer During Cooling from 120°C at the Constant Cooling Rate of 5°C/min.

Figure 1. An Example of Calorimetric Crystallization Method, Evaluation of Major Crystallization Parameters on Glycolide Monomer During Cooling from 120°C at the Constant Cooling Rate of 5°C/min.

Figure 2. PDO Monomer IV Test Data versus Crystallization Peak Obtained by CC Method Figure 3. PDO Monomer IV Test Data versus Onset of Crystallization Obtained by CC Method Figure 4. Oligomers Level Calculated by NMR for PDO Monomers versus Crystallization Peak Obtained by CC Method

Figure 5. Peak Agitator Torque Values for Glycolide Monomers versus Crystallization Peak Obtained by CC Method

Figure 6. Peak Agitator Torque Values for Glycolide Monomers versus Enthalpy (Heat) of Crystallization Obtained by CC Method Figure 7. An example of Non-Inventive, ASTM E 928-01 Purity Method Determination for Gly Monomer-20

Figure 8. An example of Non-Inventive, ASTM E 928-01 Purity Method Determination for Gly Monomer-17

CALORIMETRIC CRYSTALLIZATION METHOD FOR EVALUATION OF MONOMER PURITY

FIELD OF THE INVENTION

This invention relates to devices and methods for monitoring the purity of monomers and consequently improving their polymerization properties. Increased levels of impurities, such as free acids, oligomers, traces of solvent and residuals from the monomer synthesis, in monomer formulations directly affect the reaction/polymerization rate and decreases the molecular weight of resulting polymers. In addition, these impurities can affect critical properties, such as Breaking Strength Retention (BSR), of suture materials prepared from such polymers. If the purity of monomer is compromised, or overlooked prior a polymerization run, an entire polymer batch could result in a failure, wasting not only valuable materials, but also time and resources.

Applicants recognized previously unforeseen needs for quick, reliable, robust methods and process systems that are convenient to use in monomer or polymer manufacturing settings to estimate the purity of monomers, particularly for lactone-containing monomer formulations that are used in medical applications, such as glycolide, lactide, p-dioxanone, and caprolactone.

BACKGROUND OF THE INVENTION

Current methods used in various manufacturing plants to evaluate monomer purity, such as Test Egg Inherent Viscosity (IV), IV method, falling ball test (viscosity measurements), free acid (titration), Nuclear Magnetic Resonance, NMR for oligomers, and moisture measurements are often laborious and do not correlate well with polymerization performance. For instance, the current leading method for p-dioxanone monomer acceptance criteria is Test Egg monomer IV that is difficult to perform, extremely moisture sensitive, and takes long time for IV analysis. The method requires a monomer to be charged in a small flask under a strict inert atmosphere (glove box), together with the catalyst, and a dye if needed, but without the use of an initiator. The flask is then inserted in a preheated oil bath and polymerization is held for several hours with an agitation (stir bar) and under nitrogen flush. After the completion of the polymerization, such polymer is subjected to a drying step to remove unreacted monomer. Dried polymer is then sent for IV measurements. The test is usually done in triplicate. The method assumes that the monomer in the absence of an initiator and with minimal level of impurities will yield very high molecular weight polymer. In case of elevated level of impurities, the molecular weight will be proportionally lower. In addition, if monomer at any stages of the procedure picks up any moisture from the air, it will lower polymer's molecular weight or IV, estimating artificially poorer monomer performance.

Figure 7:
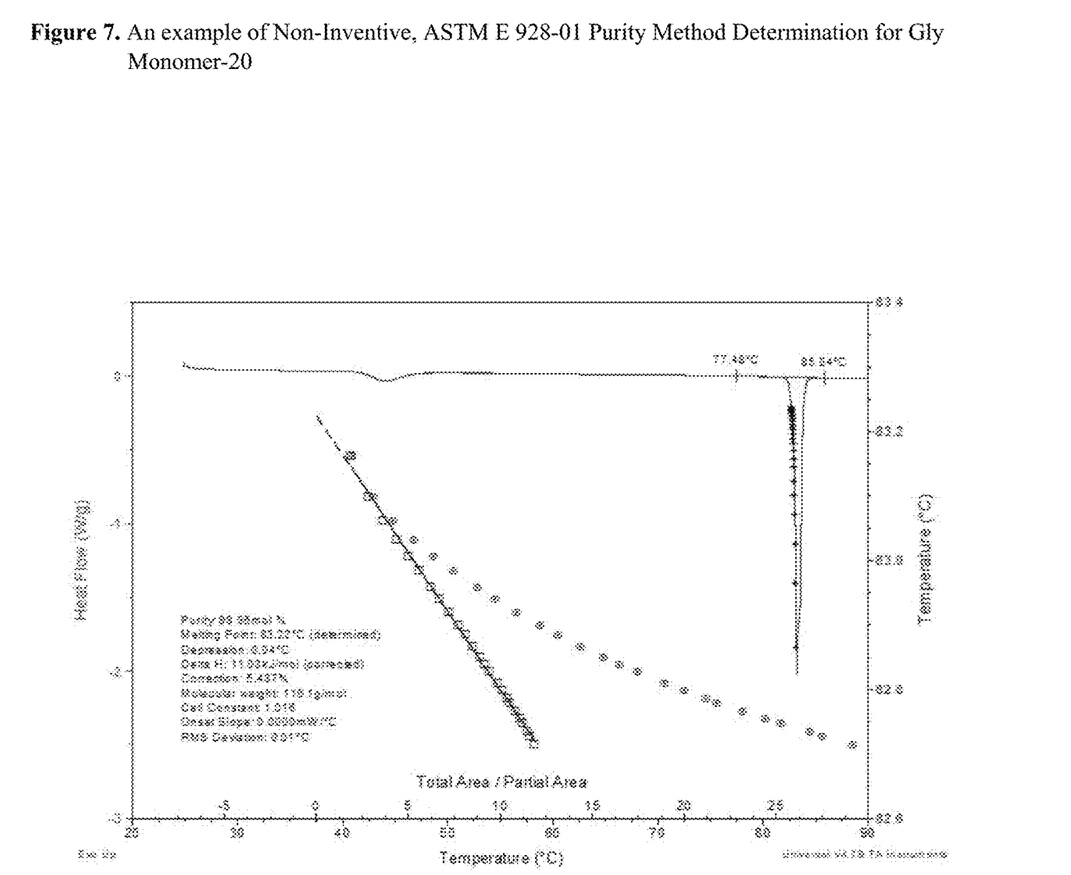
FIG. 7 illustrates results using an industry standard method based on ASTM E 928-01 Purity Method Determination for Gly Monomer-20.
Figure 8:
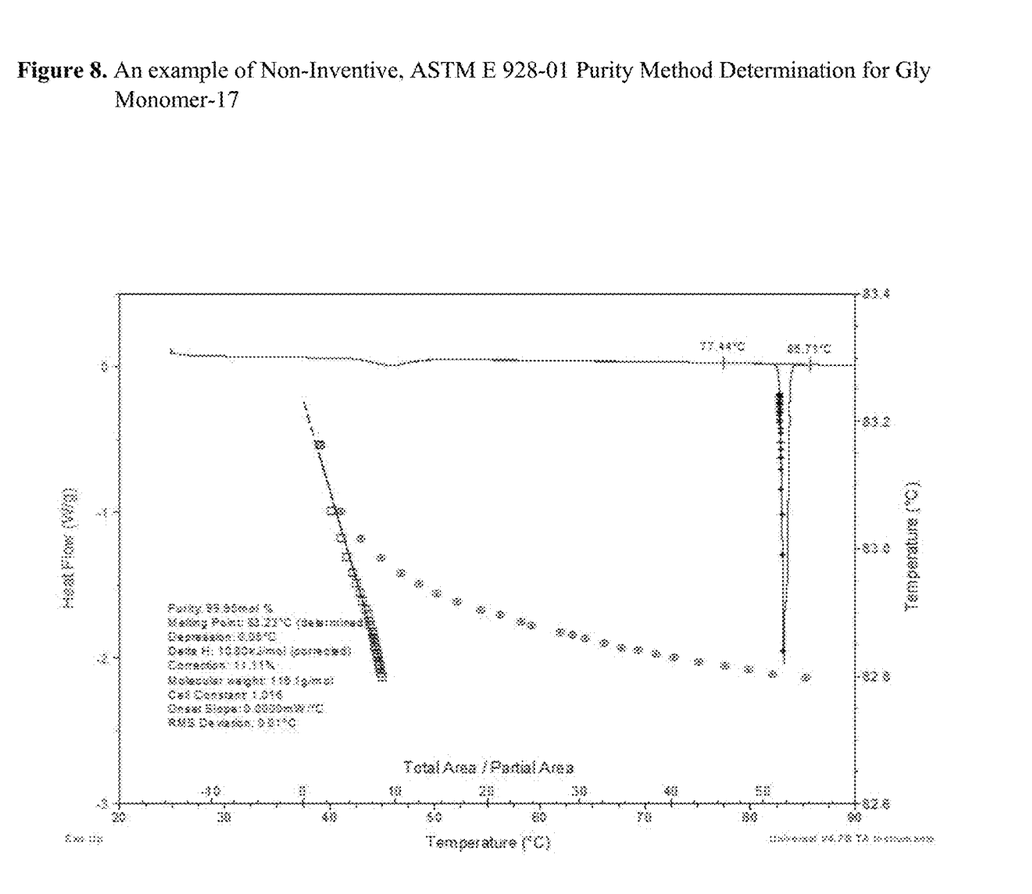
FIG. 8 illustrates results using an industry standard method based on ASTM E 928-01 Purity Method Determination for Gly Monomer-17.

Differential Scanning Calorimetry (DSC) has been used to determine monomer purity by examining the shape of its melting peak from a first heating scan (ASTM E 928-01, "Standard Test Method for Determination of purity by Differential Scanning Calorimetry"). This test method consists of melting the test specimen that is subjected to a temperature-controlled program while recording the heat flow (power) into the specimen as a function of time. The resulting endotherm area is often measured to yield the enthalpy of fusion. The melting endotherm area is then partitioned into a series of fractional areas, each assigned a temperature. A plot of the reciprocal fractional areas and their corresponding temperatures is then produced. The resulting plot is seldom a straight line. To linearize the plot, an incremental amount is added to the enthalpy of fusion and the fractional areas recalculated and plotted. The purity level is then calculated from the slope of this straight line. FIGS. 7 and 8 illustrate this approach based on data provided in Example 4 [Comparative].

The disadvantages of this approach are: a) the measurement depends heavily on the thermal history of samples; different conditions under which monomer crystallized during manufacturing may affect its melting peak properties, and b) the method is not sensitive enough to detect relatively small concentration of impurities, especially those impurities that do not co-crystallize with a monomer.

Some methods based on ASTM E 928-01 using different materials have been reported in the patent literature. For example, in U.S. Pat. No. 8,404,868, a DSC apparatus measured the impurity-containing glycolide sample that was hermetically sealed in an aluminum pan and subjected to heating at a rate of 2° C./min in a temperature range of 70-95° C. The method was used to measure a melting peak of glycolide, thereby measuring a total molar fraction of the impurities and obtaining a glycolide purity in mole %. The resultant glycolide monomer exhibited a purity of 99.90 mole %.

With the intention to produce glycolide monomer from glycolic acid (GA), a GA oligomer, U.S. Pat. No. 8,658,758 describes a process in which GA is charged into a reaction vessel, together with diethylene glycol dibutyl ether as a solvent, and octyltetraethylene glycol as a solubilizing agent. De-polymerization was performed under heating and a reduced pressure to distill out product glycolide and solvent together. The liquid glycolide was withdrawn from the bottom of the receiver, and the glycolide was purified by a tower-type purifier. The purified glycolide thus recovered exhibited a purity of 99.99% or higher by DSC measurement (ASTM E 928-1).

U.S. Pat. No. 6,187,901 teaches a method for the removal and recovery of lactide from polylactide. At the end of the process, the separated lactide was analyzed by DSC analysis using the ASTM E 928-1 approach. According to this analysis it was noted that the recovered lactide was pure L-lactide, and it had not been racemized during the evaporation and the recovery.

Solvent scrubbing recovery of lactide and other dimeric cyclic esters was described in U.S. Pat. No. 5,266,706. The final product recovered after series of cracking and scrubbing steps was washed by isopropyl alcohol (IPA) then recrystallized from IPA, followed by drying to yield white lactide crystals. Its purity determined by differential scanning calorimetry (DSC) using ASTM E 928-1 method was 99%. Its melting point reported was 96.1° C., and its optical rotation −285 degrees.

None of the references presented above use the monomer purity evaluation method described in the present invention, which is based on the crystallization phenomenon observed during cooling from the melt.

SUMMARY OF THE INVENTION

The present invention addresses many of the problems and shortcomings noted above for the evaluation of the monomer purity. In one embodiment, the present invention is directed to methods for on-line evaluation of monomer formulation purity comprising the steps of raising the temperature of the monomer formulation having a defined melting point to a first elevated temperature at least 20° C. above a preset melting point for a selected monomer formulation; cooling the monomer formulation at a controlled cooling rate in the range from about 0.5 to 50° C. per minute; measuring at least one critical property selected from the group consisting of a) crystallization peak temperature at the onset of crystallization, b) an area under the crystallization peak, which represents the heat or enthalpy of crystallization, ΔHc and combinations thereof; comparing the at least one of the selected critical properties measures relative to such properties for standard setting monomer formulations; and estimating the purity of the sample monomer formulation, wherein lower values for the temperature of the crystallization peak temperature or a smaller crystallization peak area, each relative to the standard values for corresponding standard setting monomer formulation, indicates a higher presence of impurities relative to the standard setting monomer formulation. The monomer formulation can contain one or more cyclic lactone monomeric or oligomeric units. The cyclic monomeric units can be selected from the group consisting of lactide, glycolide, para-dioxanone, lactone, caprolactone and mixtures thereof. The monomer formulation is cooled in controlled fashion using differential scanning calorimetry. In an alternative embodiment, the method includes in the measuring step above only of measuring the onset of crystallization. In another alternative, the method includes in the measuring step above only a measurement of the area under the crystallization peak.

The present invention is also directed to methods for the adjustment and preparation of polymeric compositions from a selected monomeric formulation by estimating of the purity of the monomer formulation as described above; and adjusting an initiator concentration to limit degradation and the number of chain ends and to increase the molecular weight of the resulting polymeric composition. In one alternative, the estimated purity of monomer formulation is low (high concentration of impurities), and the pre-reaction initiator concentration is adjusted lower relative to a standard pre-reaction initiator concentration for high purity monomer reaction formulations.

The present invention is also directed to methods for the adjustment and preparation of polymeric compositions from a selected monomeric formulation by estimating the purity of the selected monomer formulation as described above; and extending a polymerization time in reaction vessel to increase overall polymeric conversion. In one alternative, the polymerization time is increased due to an estimate of low purity for the selected monomer formulation.

The present invention is also directed to methods for the adjustment and preparation of polymeric compositions from a selected monomeric formulation by estimating the purity estimation of the selected monomer formulation as described above; and conducting additional purification steps to remove excess impurities. In one alternative, the additional purification steps is by recrystallization of the monomer formulation from a solvent.

The present invention is also directed to methods for the manufacture of polymer compositions from a selected monomer formulation by evaluating the monomer purity as described above and adjusting the polymerization conditions as described above and then polymerizing the selected monomer formulation, optionally as adjusted, in a reaction vessel to form a reacted polymeric formulation; discharging the reacted polymeric formulation from the reaction vessel; and drying the reaction product to remove unreacted monomer from a polymer resin, and optionally, characterizing the dry, reacted polymeric composition. In one alternative, the polymerization is conducted as a melt, as a solid-state, or in the presence of solvent. The monomer conversion can be monitored remotely within the polymer reactor in situ, in real-time by near-infrared, Raman, and Fourier Transform Near-infrared (FT-NIR) spectroscopy.

DETAILED DESCRIPTION OF THE INVENTION

The present invention discloses the use of the monomer crystallization from the melt as a tool to estimate the purity of monomers. Differential Scanning Calorimetry, DSC instrument, for instance, can be conveniently used for purposes of monitoring monomer crystallization via a melting step by heating the monomer at temperatures 30° C. above its melting point, followed by the controlled cooling steps with the constant cooling rates chosen from the range between 0.5 and 50° C./min. For lactone monomers that are widely used in various medical applications, including glycolide, lactide, p-dioxanone or caprolactone, the cooling rate of 5° C./min can be conveniently used. During the constant cooling rate scan from the melt, the monomer will crystallize. The onset of crystallization, the location of crystallization peak, and the area under the crystallization peak are parameters that can be used for monomer purity evaluation. The experiments can be repeated multiple times on fresh samples to assess the reproducibility and robustness of the method. Throughout the text this method will be called calorimetric Crystallization or CC method. However, the scope of this invention is not only Calorimetric approach which is described above, but any other techniques that can detect the temperature at the onset of monomer crystallization upon cooling from the melt.

Applicants discovered that even very low level of impurities (less than 1%) affects the ability of the monomer to crystallize out of the melt, making the crystallization more difficult. This problem may be due to steric hindrance arising from the presence of impurity species that causes molecular asymmetry regardless of a type. Applicants also found that monomers containing less impurities crystallize at higher temperature, and also, with higher crystallinity level as measured, for instance, by the enthalpy (heat) of crystallization. Applicants also found that the method of the present invention is not affected by the absorbed moisture from the air, which aids in its robustness and reliability.

The proposed crystallization-based method can be conveniently used in polymer raw material (monomer) evaluation. Detecting a lower quality monomer before its use in polymerization allows for the potential to adjust polymer processing parameters, which in turn, could prevent a failure of resulting polymerization batches. These potential adjustment steps may include: a) adjusting the initiator concentration to limit degradation and to increase the molecular weight of the polymer; b) extending the polymerization time to allow optimal conversion and counteracting the slower polymerization kinetics; and c) where and when practical, conducting additional purification steps to remove excess impurities from the monomer formulation.

In this section, we will describe a novel, crystallization-based method of evaluation of monomers' purity. The Differential Scanning Calorimetry (DSC) instrument can be conveniently used to perform the required cooling scans from the melt. However, other equipment and technique, or means of detecting the crystallization temperature upon cooling from the melt is within the scope of this invention. These alternative techniques may include, but are not limited to, calorimetric methods, light scattering, density or volume measurements, dynamic mechanical analysis, turbidity, or any possible way of observing the phase transition when liquid monomer formulations solidify during a cooling phase from the melt phase.

DSC can be conveniently used to perform the required cooling scans from a melt phase to support this application. Calorimetric data for this application was generated on a TA Instruments' Differential Scanning Calorimeter, DSC Model 2910 MDSC, using dry nitrogen as a purge gas. Typically, about 10-15 mg of a selected monomer formulation in powder form was placed in an aluminum pan, secured by a lid (cover), and positioned in the autosampler holder area of the instrument. Two or more non-isothermal scans can be employed as needed: a) First heat scan (optional): a monomer was quenched to −40° C., followed by the constant heating rate at 10° C./min up to the temperature range between 60 and 120° C., depending on a monomer; typically, 20-30° C. higher temperature than its melting point; and b) First/main cooling scan: after melting of a sample at the temperature range between 60 and 120° C. for three minutes, the monomer formulation in melt phase is subjected to the controlled cooling step with the constant cooling rate of 5° C./min, c) Second (optional) cooling scan: after re-melting of a sample at the temperature range between 60 and 120° C. for three minutes, a monomer is subjected to the second controlled cooling step with the constant cooling rate of 10° C./min. The first heat scan data are indicative of "as is" properties of a sample and, as such, are largely dependent on its thermal history. For this invention, the first scan is optional, and may be used for supporting information only. The first or main cooling scan, on the other hand, is independent of thermal history of the sample and can be used to assess monomer purity information by monitoring the following parameters: a) the location of the crystallization peak, Tc expressed in ° C.; b) the onset of crystallization, also expressed in ° C.; and c) the area under the crystallization peak, i.e. heat or enthalpy of crystallization, ΔHc, expressed typically in J/g. ΔHc is directly related to the level of crystallinity obtained during the cooling scan.

Figure 1:
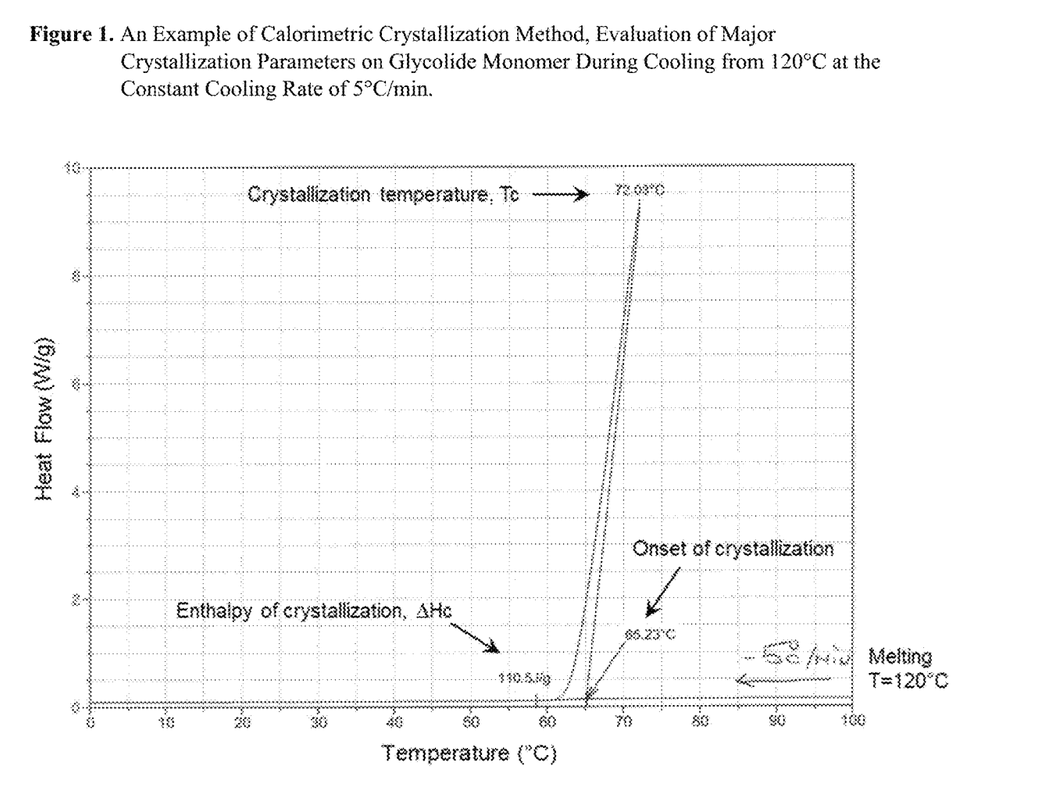
FIG. 1 is an illustrative example of the calorimetric crystallization method and evaluation of major crystallization parameters for a glycolide monomer during cooling at a constant cooling rate.

An example of typical Calorimetric Crystallization (CC data) on glycolide monomer is presented in FIG. 1. Using the DSC apparatus and procedures described above, the glycolide monomer was melted at 120° C. and subjected to the constant controlled cooling rate of 5° C./min. During cooling, the sample crystallized, which is manifested by the exothermic curve with the onset of crystallization at 65.23° C., and the location of the crystallization peak at 72.03° C. In contrast to DSC scans of polymers, the onset of the crystallization is observed at lower temperature than the actual peak location due to supercooling effect. This is a characteristic DSC feature for the majority of fast crystallizing monomers. In addition, enthalpy of the crystallization (110.5 J/g) can be used to calculate the percent of crystallization developed during this cooling step. Applicants discovered that the presence of impurities can affect the ability of the monomer to crystallize out of the melt, making the crystallization more difficult. Without intending to be bound to a particular theory, the change in crystallization performance is probably due to steric hindrance, or asymmetry imposed by the presence of impurity species, regardless of a type. Therefore, a monomer containing less impurities crystallizes at higher temperature, and with higher crystallinity level as measured, for instance, by the enthalpy of crystallization.

Supporting Experimental Techniques:

Inherent viscosity (IV), used for Test Egg IV (as described below) monomer measurements, were conducted in hexafluoroisopropanol (HFIP) at 25° C. and at a concentration of 0.10 g/dL. The molecular weight measurements were performed using Gel Permeation Chromatography (GPC) equipped with Wyatt's Optilab rEx refractometer and Wyatt's HELEOS II multi-angle laser light scattering detector. During the measurements, PL HFIP gel columns were maintained at 40° C., with a mobile phase consisting of HFIP with 0.01M LiBr (0.2% $H_2O$) operating at the flow rate of 0.7 ml/min. Empower and Astra software were used for data analysis. Two PL HFIP gel columns were used operated at 40° C., and HFIP with 0.01 M LiBr (0.2% H2O) as a mobile phase. Flow rate was 0.7 mL/min with injection volume of 70 µL. Solution concentration was approximately 2 mg/mL.

The Nuclear Magnetic Resonance (NMR) method identifies and determines the chemical composition of monomers and oligomers using proton nuclear magnetic resonance ($^1$HNMR) spectroscopy. The instrument used for this application was the 400 MHz (9.4 Tesla) Varian Unity INOVA NMR Spectrometer; an appropriate deuterated solvent, such as Hexafluoroacetone sesquideuterate (HFAD) of at least 99.5% purity D (ETHICON ID #2881, CAS 10057-27-9) was used. Sample preparation: In triplicate, 6-10 mg of each sample was weighted and placed into separate 5 mm NMR tubes. Under nitrogen gas in a glove box, 300+/−10 µL of HFAD was added using 1000 microliter syringe, to each NMR tube and cap. Meanwhile, a solvent blank was prepared. The samples were then removed from the nitrogen glove bag/box and NMR tube(s) were placed in a sonic bath, and sonicated until the sample was dissolved, and no evidence of solid polymer existed. Subjecting the samples again under the nitrogen flow, 300+/−10 µL benzene-d6 was added using a 1000 µL syringe to each NMR tube and capped. The tubes were shaken well to ensure uniform mixing of the HFAD and benzene-d6 solvents.

Where applicable, a validated test method for the determination of purity of p-dioxanone monomer by the test polymerization experiment is used. Here, a summary of sample preparation steps for the aforementioned "Test Egg IV" examination is given below. Inside a nitrogen glovebox area, a PTFE magnetic stir bar and PDO monomer were inserted into 25 mL glass round-bottom flask, as well as PTFE sleeve and glass vacuum adapter with PTFE stopcock. Next, stannous octoate catalyst solution was charged into the round-bottom flask with monomer, and the contents were held under vacuum for specified time, backfill with nitrogen gas to partial vacuum, and the PTFE stopcock was closed to seal the apparatus. The round-bottom flask was submerged in oil bath set to a reaction temperature, and the flask was kept in the oil bath for a specified reaction time. After the reaction was completed, the flask was removed from the oil bath, allowed to cool, transferred into plastic bag with nitrogen gas, and stored in freezer until ready to collect sample. For this task, the flask was broken, and the resulting polymer hemisphere extracted and placed in a vise, which was tightened until the polymeric material shattered (or it can be drilled into the hemisphere to create shavings). These steps created small pieces to be collected in vials for analytical testing. Inherent Viscosity testing is described using the instrument and procedures described above.

A free acid level determination is routinely performed on lactone monomers using, for instance, the titration method DS-TMD-23389 specifically designed for PDO monomer ("Determination of the Free Acid Concentration in PDO Monomer Commercial Intermediate by Titration"). In general, there has not been a strong agreement between the acid level and Test Egg monomer IV data, or polymerization outcome, including the conversion rate and final polymer molecular weight. However, it is possible that residual acid groups can play a significant role in hydrolysis, making the medical devises made from these polymers more acceptable to degradation.

The first required step for the inventive purity estimation process is to raise the temperature of a monomer formulation having a defined melting point to a first elevated temperature that is at least 20° C. above the defined melting point. This is a necessary step to remove any previously formed crystals or nuclei that may exist in monomer formulation. Once the formulation reaches that temperature, a typical dwell at that temperature for about 2 to 5 minutes is used to reach the temperature equilibrium.

The second step is to cool the monomer formulation at a controlled cooling rate (using DSC-Differential Scanning Calorimetry, or any other applicable technique) in the range from about 0.5 to 50° C. per minute, preferably between about 2 and 20° C. per minute, the most preferably between about 4 and 10° C. per minute. For monomers that crystallize at lower temperatures, an instrument used to practice the current invention needs to have a cooling system, capable of cooling the sample to about minus (−)20° C. or lower, while keeping the cooling rate constant throughout the entire regime.

During the cooling step described above, the sample will crystallize, which is manifested by the exothermic curve in cases calorimetric measurements were used. The next step is to measure the crystallization peak temperature, which is generally expressed in ° C. This could be conveniently done by a computer software, or any other means including manual or visual detection of the location of the exothermic crystallization peak.

One can also practice the method of this invention by measuring the onset of crystallization. This onset of crystallization is a temperature (usually expressed in ° C.) when the first sign of crystallization is detected during the constant cooling from the melt. Similarly, one can practice the method of this invention when using a DSC instrument by measuring the area under the crystallization peak, which represents the heat or enthalpy of crystallization, ΔHc, expressed typically in J/g. ΔHc is directly related to the level of crystallinity obtained during the cooling scan. To calculate ΔHc one needs to enter the sample weight, measured, for instance by an analytical balance.

After completion of the runs, the next step is to compare the measured crystallization peak temperature, onset of crystallization, and the area relative to standard values for crystallization peak temperature, the onset of crystallization and area under the curve for pure monomer formulations. Based on the data generated by using the method of the present invention across multiple monomer formulations, one can estimate the purity of the current sample monomer formulation.

In one embodiment, for the method for the adjusting the preparation or production of polymeric materials from a monomer formulation following steps are needed:
 a) Determination of the purity estimation of monomer formulation as described above; and
 b) Adjusting the initiator concentration to limit degradation and number of chain ends and to increase the molecular weight of the polymer.

Applicants found that various impurities that may be present in monomers can open the lactone ring and start polymerization, acting as an additional initiator species. If an initial initiator concentration (typically an aliphatic, linear alcohol) is already high, an extra initiator species may produce high number of chains, thus lowering the molecular weight of polymers. Polymers with lower molecular weight usually produce medical devices with lower strength and, in the case of absorbable polyesters, could promote faster hydrolysis. By estimating the monomer purity from the previous step, (a), one can adjust the starting initiator concentration to account for the effect of the present impurities. For instance, if the purity of monomers is low (high concentration of impurities), one can lower the starting initiator concentration to keep the molecular weight high.

In another embodiment, for the method for the adjusting the preparation or production of polymeric materials from a monomer formulation following steps are needed:
 a) Determination of the purity estimation of monomer formulation as described above; and
 b) Extending the polymerization time to allow optimal conversion to counteract the slower polymerization kinetics.

Applicants found that depending of a type of impurities present, polymerization (reaction) kinetics are often slower than expected. If the purity of a monomer is estimated under the procedures described above, one can adjust the reaction time to reach an optimal conversion of monomer to polymer before a discharge. Premature discharge would lower the polymer yield, and in some cases high amount of residual monomer could cause degradation during post-processing.

In another embodiment, for the method for the adjusting the preparation or production of polymeric materials from a monomer formulation following steps are needed:
 a) Determination of the purity estimation of monomer formulation as described above; and
 b) Conducting additional purification steps to remove excess impurities.

In cases where the purity evaluation under step a) reveals very high concentration of impurities that cannot be addressed by the previous steps, and can negatively affect critical properties such as polymer molecular weight, monomer conversion, and/or hydrolysis, additional monomer purification step is needed. This could be done by various means, for instance, by recrystallization from a solvent.

For the method for manufacturing polymer from a monomer formulation comprising:
a) Evaluating the monomer purity and
b) Adjusting the polymerization conditions as described above and then
c) Polymerizing the monomer formulation as adjusted in a reaction vessel to form a reacted polymeric formulation;
d) Discharging the reacted polymeric formulation from the reaction vessel; and
e) Drying the reaction product to remove unreacted monomer from a polymer resin, after this step one can optionally proceed with,
f) Characterizing the dry, reacted polymeric formulation, i.e. polymer resin.

Various analytical techniques can be used to measure molecular weight of the polymer resin, inherent viscosity, calorimetric properties, residual monomer level, percent of crystallinity, etc.

Polymerization can be conducted in melt (preferable), during solid-state, or in the presence of solvent. Typically, at the start of polymerization, catalyst and initiator are added, and in some cases a dye or colorant. One or multiple monomers (copolymers) can be used. Polymerization progress can be monitored in real-processing time, or off-line. Several spectroscopic techniques are suitable for remotely following monomer conversion in reactors in situ, in real-time, including near-infrared, Raman, and Fourier Transform Near-infrared (FT-NIR) spectroscopy. When monomer conversion reaches a desired level, a formed polymer can be discharged into suitable containers, or can undergo in-line pelletization step, such as underwater pelletization. In the case of absorbable polymers, the discharged polymer resin can be stored prior to the next processing step under inert atmosphere or vacuum. Selected resins can also be stored in the freezer for a longer time. The drying can be done using vacuum at elevated temperatures, or using hot nitrogen, or dry air flash.

Many techniques are known that can detect the temperature of crystallization. Such techniques may include calorimetric, light scattering, density or volume measurements, practically any way of detecting the monomer phase transition from liquid to solid.

The following examples are illustrative of the principles and practice of the present invention, although not limited thereto. Numerous additional embodiments within the scope and spirit of the invention will become apparent to those skilled in the art once having the benefit of this disclosure.

Example 1. Inventive Calorimetric Crystallization Method for Evaluating Purity of p-Dioxanone, PDO Monomers This example describes the use of the crystallization-based method of the present invention for the purity evaluation of p-dioxanone, PDO monomers. The monomers for this study were obtained from Cilag AG (Schaffhausen, Switzerland), and Janssen (Athens, Ga.).

Table 1. below summarizes data on 34 monomers of different purities. Along the CC method of the present invention, corresponding comparative data obtained by Test Egg IV method (TM403-066), as well as oligomer concentration by NMR and free acid level using the titration method (DS-TMD-23389) are given for available samples.

Using the DSC apparatus and procedures described previously, PDO monomers were melted at 60° C. for three minutes, and subjected to the constant controlled cooling rate of 5° C./min. During cooling, the samples crystallized, which is manifested by the exothermic curve whose characteristic parameters, such as the onset of crystallization, location of crystallization peak, and enthalpy of crystallization are recorded and presented in Table 1.

TABLE 1

Calorimetric Crystallization data on PDO monomers obtained during constant cooling step from 60° C. at 5° C./min.

| Monomer ID | Tc (° C.) | Sdev (n = 5) | Onset Cryst. (° C.) | Sdev (n = 5) | deltaH (J/g) | Sdev (n = 5) | Test Egg IV (dL/g) | Oligomers NMR (%) | Free Acid (mEq/kg) |
|---|---|---|---|---|---|---|---|---|---|
| PDO Monomer-1 | 7.67 | 1.1 | −3.74 | 0.8 | 134.4 | 2.76 | 2.8 | 0.10 | NA |
| PDO Monomer-2 | 3.38 | 2.1 | −9.03 | 0.6 | 130.2 | 4.33 | 2.9 | NA | NA |
| PDO Monomer-3 | 3.93 | 1.2 | −7.70 | 0.6 | 126.0 | 3.28 | 2.4 | 0.15 | NA |
| PDO Monomer-4 | 7.71 | 0.7 | −3.69 | 0.3 | 129.8 | 1.60 | 3.8 | 0.07 | NA |
| PDO Monomer-5 | 5.06 | 1.4 | −6.15 | 0.5 | 124.9 | 1.92 | 3.2 | 0.14 | NA |
| PDO Monomer-6 | 7.46 | 0.4 | −4.52 | 0.4 | 133.7 | 3.20 | 3.7 | 0.06 | NA |
| PDO Monomer-7 | 8.03 | 1.5 | −3.80 | 1.0 | 130.5 | 1.52 | 3.6 | 0.07 | NA |
| PDO Monomer-8 | 6.34 | 1.0 | −4.63 | 1.0 | 130.7 | 4.16 | 3.6 | 0.00 | NA |
| PDO Monomer-9 | 7.25 | 0.9 | −3.92 | 0.9 | 133.1 | 2.62 | 3.8 | 0.08 | 0.60 |
| PDO Monomer-10 | 7.69 | 1.3 | −4.08 | 0.6 | 137.9 | 1.43 | 3.6 | 0.17 | 2.10 |
| PDO Monomer-11 | 1.05 | 1.2 | −9.24 | 2.1 | 125.4 | 1.94 | 3.0 | 0.39 | 4.60 |
| PDO Monomer-12 | 2.33 | 2.0 | −10.02 | 1.7 | 132.8 | 1.63 | 2.8 | 0.50 | 8.30 |
| PDO Monomer-13 | 2.21 | 1.7 | −8.79 | 1.1 | 128.9 | 3.70 | 3.0 | 0.42 | 4.90 |
| PDO Monomer-14 | 0.76 | 1.9 | −10.38 | 0.5 | 131.2 | 3.69 | 2.6 | 0.54 | 4.60 |
| PDO Monomer-15 | 1.19 | 2.0 | −10.08 | 0.7 | 125.2 | 2.77 | 2.2 | 0.59 | 22.90 |
| PDO Monomer-16 | 3.31 | 1.2 | −8.66 | 1.5 | 131.0 | 3.93 | 2.2 | 0.66 | 3.90 |
| PDO Monomer-17 | 0.04 | 1.5 | −11.37 | 0.8 | 130.5 | 2.31 | 1.8 | 0.33 | 3.80 |
| PDO Monomer-18 | −2.76 | 4.4 | −12.78 | 1.5 | 126.1 | 4.40 | 1.8 | 0.66 | 3.80 |
| PDO Monomer-19 | −1.09 | 1.1 | −13.01 | 0.7 | 125.8 | 1.43 | 1.9 | 0.33 | 3.80 |
| PDO Monomer-20 | 2.01 | 1.5 | −9.69 | 2.4 | 132.2 | 3.65 | 2.0 | 0.37 | 3.10 |
| PDO Monomer-21 | −0.58 | 1.3 | −11.97 | 1.0 | 126.8 | 2.48 | 1.9 | 0.36 | 3.10 |
| PDO Monomer-22 | −1.39 | 1.7 | −10.71 | 0.6 | 130.1 | 2.63 | 1.9 | 0.41 | 3.10 |
| PDO Monomer-23 | 1.46 | 2.5 | −10.55 | 1.2 | 132.4 | 1.77 | 3.0 | 0.37 | 2.90 |
| PDO Monomer-24 | 2.66 | 1.8 | −9.99 | 1.5 | 131.2 | 1.72 | 3.0 | 0.34 | 2.90 |
| PDO Monomer-25 | 0.76 | 1.7 | −11.40 | 0.4 | 130.7 | 2.86 | 2.9 | 0.33 | 2.90 |
| PDO Monomer-26 | 1.94 | 1.9 | −11.42 | 0.7 | 132.4 | 1.27 | 3.2 | 0.36 | 3.00 |
| PDO Monomer-27 | 3.65 | 2.9 | −7.38 | 1.6 | 130.5 | 0.98 | 2.8 | 0.42 | 3.00 |

TABLE 1-continued

Calorimetric Crystallization data on PDO monomers obtained during constant cooling step from 60° C. at 5° C./min.

| Monomer ID | Tc (° C.) | Sdev (n = 5) | Onset Cryst. (° C.) | Sdev (n = 5) | deltaH (J/g) | Sdev (n = 5) | Test Egg IV (dL/g) | Oligomers NMR (%) | Free Acid (mEq/kg) |
|---|---|---|---|---|---|---|---|---|---|
| PDO Monomer-28 | 2.33 | 1.0 | −9.75 | 1.0 | 132.6 | 1.21 | 3.1 | 0.33 | 3.00 |
| PDO Monomer-29 | −5.97 | 1.5 | −13.90 | 2.5 | 120.7 | 2.50 | 2.2 | NA | 3.30 |
| PDO Monomer-30 | 0.37 | 3.2 | −7.44 | 0.9 | 129.5 | 3.02 | 2.9 | NA | 0.70 |
| PDO Monomer-31 | −3.54 | 1.0 | −11.08 | 1.6 | 125.1 | 2.77 | 2.6 | NA | 3.00 |
| PDO Monomer-32 | −5.86 | 2.6 | −11.69 | 0.7 | 120.2 | 5.11 | 1.7 | NA | 1.70 |
| PDO Monomer-33 | −1.63 | 1.5 | −12.40 | 0.7 | 127.1 | 3.20 | 0.8 | 0.25 | 2.50 |
| PDO Monomer-34 | 6.59 | 1.4 | −3.64 | 0.7 | 131.0 | 5.08 | 3.5 | 0.15 | 1.60 |

Due to a high sensitivity of the method of the present invention to the presence of impurities, a wide range of crystallization parameters were detected, suggesting vastly different purity levels. From the data presented in Table 1, the onset of crystallinity ranges from—(minus) 13.19° C. (bad monomer) to—(minus) 3.64° C. (good monomer). The location of the crystallization peak varies between—(minus) 5.97° C. (bad monomer) to (plus) 8.03° C. (good monomer). Similarly, the enthalpy of crystallization is found between 120.2 J/g (bad monomer) and 137.9 (good monomer). Each monomer was tested five times using fresh samples. Standard deviation for all CC parameters is low, indicating a robust and reliable method.

Figure 2:
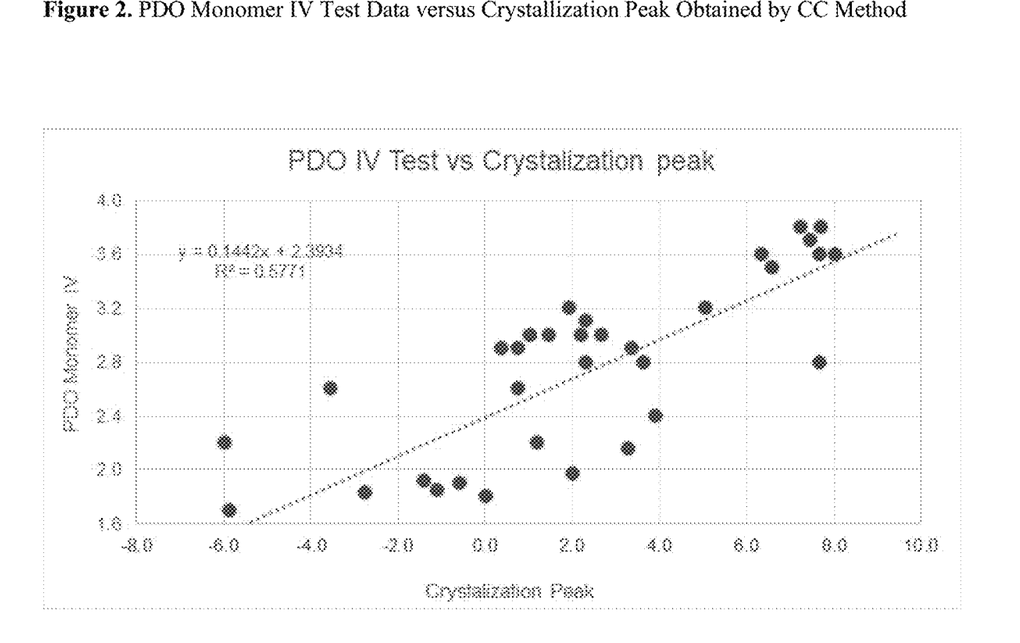
FIG. 2 is a graph of a monomer intrinsic viscosity (IV) versus crystallization peak data obtained by a calorimetric crystallization method.
Figure 3:
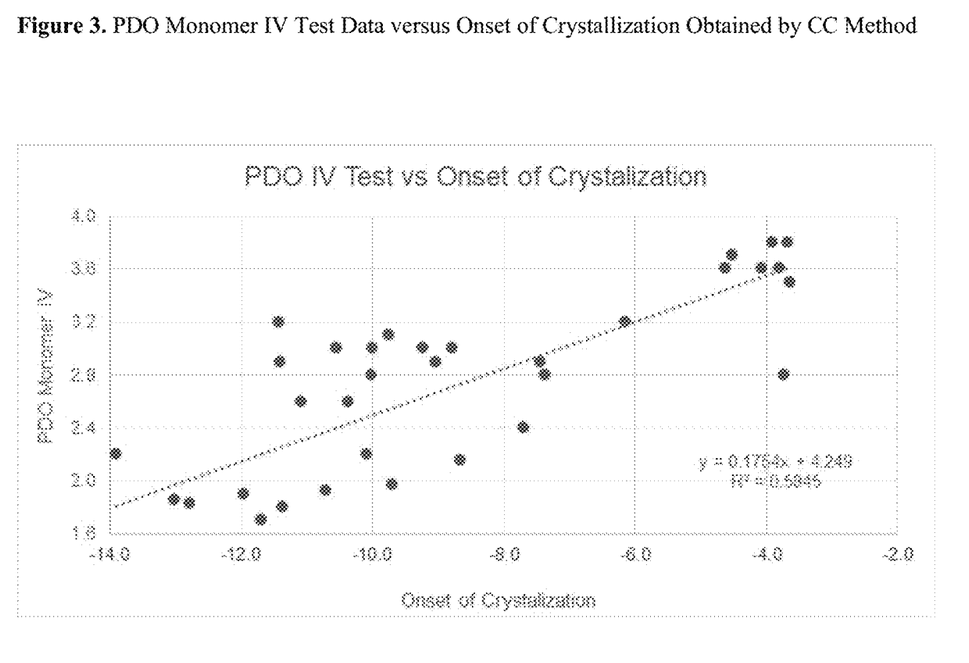
FIG. 3 is a graph of a monomer intrinsic viscosity (IV) versus onset of crystallization data obtained by a calorimetric crystallization method.

CC data showed good agreement with Test Egg IV data, despite the difficulties and complexity running the inherent viscosity procedures (sample preparation, moisture sensitivity, polymerization, IV testing). FIG. 2 represents the correlation diagram between the location of the crystallization peak as determined by CC method and Test Egg IV values. Similarly, the relationship between the onset of crystallization as determined by CC method and Test Egg IV values is given in FIG. 3. Higher PDO monomer IV numbers produce higher crystallization temperatures.

Figure 4:
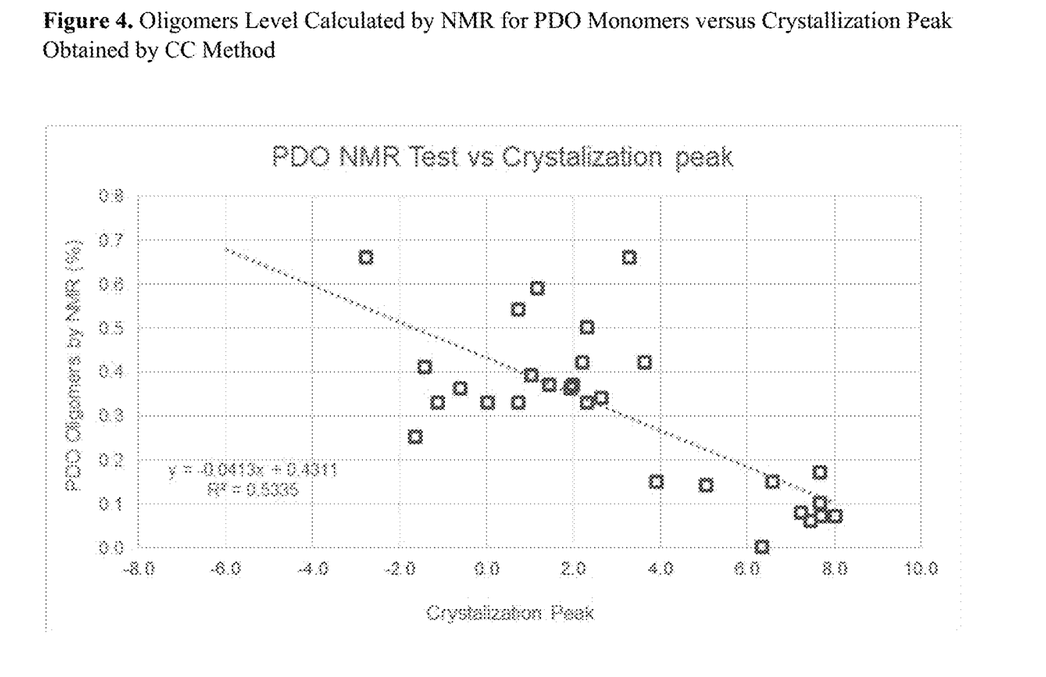
FIG. 4 is a graph of oligomer levels as calculated by NMR for monomers versus crystallization peak data obtained by calorimetric crystallization method.

CC data also agrees well with the oligomer percentages as measured by NMR. FIG. 4 shows the location of the crystallization peak as determined by CC method as a function of oligomers present. In this case, higher the concentration of oligomers in monomers results in crystallization observations at lower temperatures. Finally, no attempt was made to correlate CC data with free acid determination because Applicants are not aware of a reliable correlation between polymerization efficacy, as measured by Test Egg IV data and free acid values. However, free acid level might be important features, since elevated carboxyl group presence might promote faster hydrolysis; for instance, sutures made by higher residual acid levels may exhibit faster BSR profiles.

Example 2. Inventive Calorimetric Crystallization Method for Evaluating Purity of Glycolide, Gly Monomers This example describes the use of the method of the present invention for the purity evaluation of glycolide monomers. The monomers for this study were supplied from Cilag AG (Schaffhausen, Switzerland) and Janssen (Athens, Ga.). The purity of glycolide monomer coming from different sources was previously analyzed by the combination of NMR, (Liquid Chromatography/Mass Spectroscopy) LC-MS, and (Gas Chromatography/Mass Spectroscopy) GC-MS techniques. The major source of impurity in a glycolide monomer was found to be linear and cyclic oligomers, including glycolylglycolate, a linear hexamer, and cyclic-pentamer as predominant foreign species.

For CC examination by DSC technique, each monomer was tested five times using fresh samples. Before running experiments, all tools used were carefully cleaned. The sampling was done randomly from mid-size plastic containers previously stored in the freezer and thawed overnight in nitrogen cabinet with minimal exposure to ambient condition prior to the testing. Glycolide monomers, in a fine powder form, were uniformly deposited via clean spatula in aluminum pans ensuring good thermal contact.

Heating/cooling cycle per experiment were as follows:
i. Quenched to −20° C., followed by the constant heating rate at 10° C./min to 120° C. ($1^{st}$ heat, Optional)
ii. After 3 minutes dwell at 120° C., constant cooling step at −5° C./min to −20° C. was employed (CC method)
iii. From −20° C., the constant heating rate at 10° C./min to 120° C. ($2^{nd}$ heat, Optional)
iv. After 3 minutes dwell at 120° C., constant cooling step at −10° C./min to −20° C. was employed (CC method, Optional examining different cooling rates)

The first heat scan was optional, one can use it to obtain data for information purposes only. We found that the first heat parameters, in most cases, were not sensitive enough to distinguish between monomers having different purity levels. Prior to the cooling step from the melt (CC method of the present invention), the samples just need to be brought above their melting temperature to ensure complete amorphous phase. This is the starting point of the measurement, regardless of the heating rate applied to arrive in the melt state. For glycolide and lactide monomer families, 120° C. was selected as the starting point.

Table 2. below summarizes data on 19 glycolide monomers of different purities. For comparison purposes, the corresponding peak agitator torque values are also given for available samples. There is no validated test for glycolide purity that manufacturing sites can use (no Test Egg IV procedure exist, for instance). During polymerization reactions, for the constant temperature and agitator speed, the torque value can provide the information about polymer melt viscosity. Higher torque value is expected to produce a higher melt viscosity, which may indicate higher polymer molecular weight, and/or low monomer content.

TABLE 2

Calorimetric Crystallization data on Glycolide monomers obtained during constant cooling step from 120° C. at 5° C./min.

| Monomer ID | Tc (° C.) | deltaHc (J/g) | Peak Agitator Torque |
|---|---|---|---|
| Gly Monomer-1 | 31.6 | 86.0 | 44 |
| Gly Monomer-2 | 38.3 | 90.4 | 42 |
| Gly Monomer-3 | 35.9 | 90.7 | 42 |

TABLE 2-continued

Calorimetric Crystallization data on Glycolide monomers obtained during constant cooling step from 120° C. at 5° C./min.

| Monomer ID | Tc (° C.) | deltaHc (J/g) | Peak Agitator Torque |
|---|---|---|---|
| Gly Monomer-4 | 36.0 | 90.7 | 22 |
| Gly Monomer-5 | 33.8 | 93.4 | 30 |
| Gly Monomer-6 | 32.2 | 90.1 | 19 |
| Gly Monomer-7 | 33.0 | 91.1 | 28 |
| Gly Monomer-8 | 37.6 | 91.4 | 23 |
| Gly Monomer-9 | 49.3 | 94.8 | 20 |
| Gly Monomer-10 | 39.2 | 90.8 | 30 |
| Gly Monomer-11 | 37.2 | 89.0 | 22 |
| Gly Monomer-12 | 40.2 | 90.2 | 46 |
| Gly Monomer-13 | 71.1 | 109.2 | 79 |
| Gly Monomer-14 | 56.3 | 97.2 | 30 |
| Gly Monomer-15 | 58.2 | 94.7 | 34 |
| Gly Monomer-16 | 63.0 | 101.0 | NA |
| Gly Monomer-17 | 59.9 | 102.5 | NA |
| Gly Monomer-18 | 64.3 | 102.1 | NA |
| Gly Monomer-19 | 73.9 | 109.6 | NA |

As was the case for CC data described in Example 1, a wide range of crystallization parameters were detected, indicating different purity levels. For the selected data presented in Table 2, the location of the crystallization peak varies between 31.6° C. (bad monomer) to 73.9° C. (good monomer). Similarly, the enthalpy of crystallization is in the range from 86.0 J/g (bad monomer) and 109.6 (good monomer).

Figure 5:
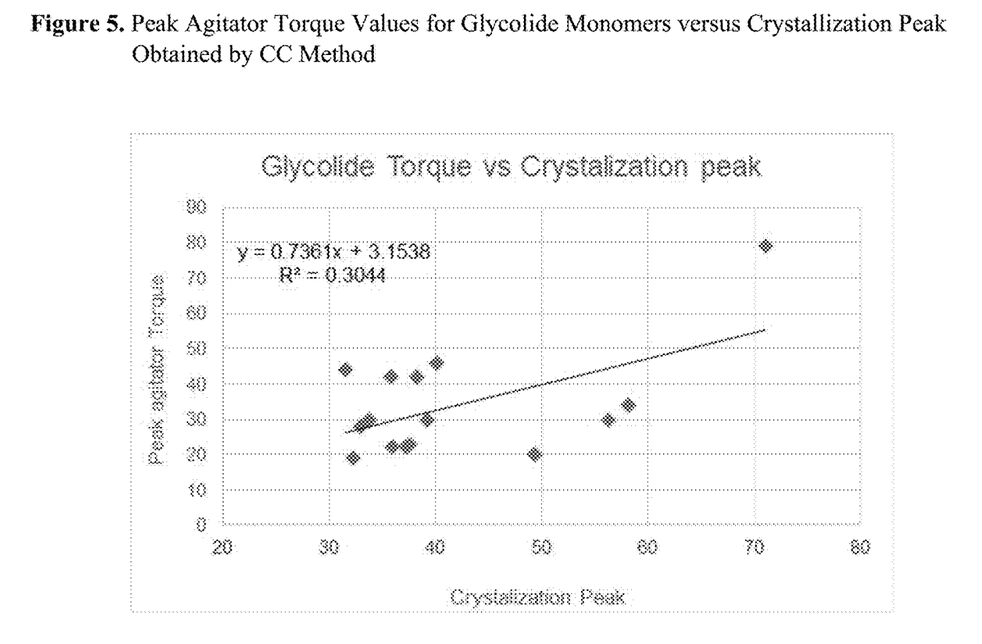
FIG. 5 is a graph of peak agitator torque values for glycolide monomers versus crystallization peak data obtained by calorimetric crystallization method.
Figure 6:
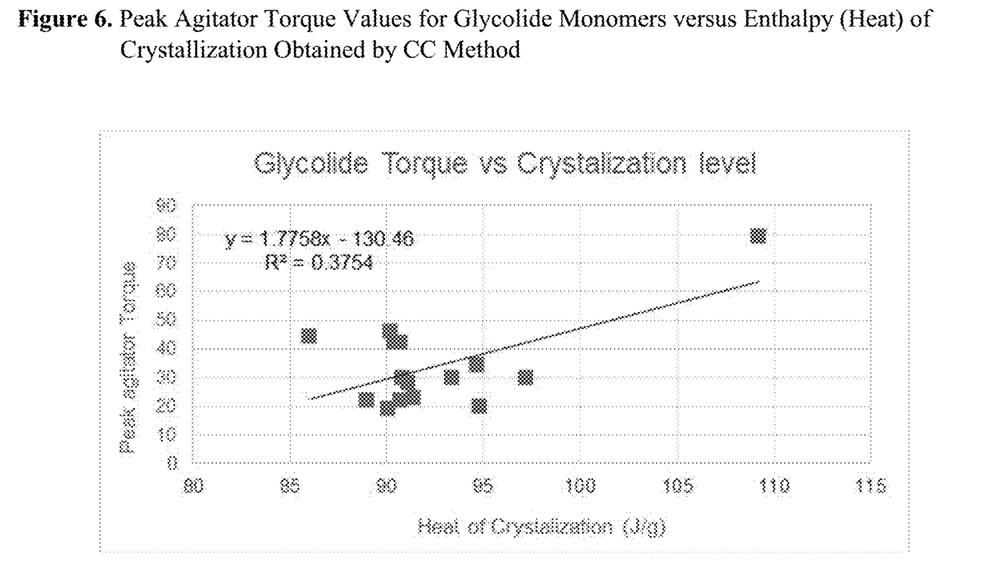
FIG. 6 is a graph of peak agitator torque values for glycolide monomers versus enthalpy (heat) of crystallization data obtained by calorimetric crystallization method.

Correlation between CC parameters, crystallization temperature and heat (enthalpy) of crystallization with corresponding Torque values is given in FIGS. 5 and 6, respectively. Unfortunately, the Torque values for glycolide monomers 16, 17, 18, and 20 were not taken. Those polymerization runs were described by manufacturing as very successful yielding high molecular weight polymers. This observation agrees very well with CC data, all indicating high crystallization temperature and high enthalpy values for Gly Monomers-16 to 19.

Example 3. Inventive Calorimetric Crystallization Method for Evaluating Purity of Lactide, Lac Monomers This example describes the use of the method of the present invention for the purity evaluation of L(−)-lactide monomers. The monomers for this study were supplied from Purac (Gorkum, Netherlands). When tested, impurities in lactide monomers have been extremely low, while polymerization runs always yielded high molecular weight polymers.

Using the DSC apparatus and procedures described previously, four lactide monomers used in the last ten years at Ethicon were melted at 120° C. for three minutes, and subjected to the constant controlled cooling rate of 5° C./min. During cooling, the samples crystallized, which is manifested by the exothermic curve whose characteristic parameters, such as the onset of crystallization, location of crystallization peak, and enthalpy of crystallization are recorded and presented in Table 3. Each monomer was tested four times using fresh samples. As was the case with other monomers tested by the CC method, the standard deviation for all parameters is low, indicating a robust and reliable method.

TABLE 3

Calorimetric Crystallization data on Lactide L(−) monomers obtained during constant cooling step from 120° C. at 5° C./min.

| Monomer ID | Tc (° C.) | Standard Deviation (n = 4) | ΔHc (J/g) | Standard Deviation (n = 4) |
|---|---|---|---|---|
| Lac Monomer-1 | 89.5 | 0.6 | 102.0 | 4.2 |
| Lac Monomer-2 | 88.3 | 0.9 | 99.1 | 1.3 |
| Lac Monomer-3 | 88.4 | 1.1 | 99.5 | 1.6 |
| Lac Monomer-4 | 87.9 | 0.6 | 98.5 | 0.8 |

In addition, CC data in Table 3 suggest very high monomers' purity, all of them exhibiting high crystallization temperature (around 88-89° C.), and high enthalpy values (99-102 J/g). The fact that the crystallization temperature is close to its melting point (around 100° C.) indicates high crystallization ability for these monomers.

Example 4. Comparative Monomers' Purity Evaluation Studies Using the Inventive Calorimetric Crystallization Method and the Non-Inventive ASTM E 928-1 Method This example compares directly the method of the present invention (CC method) with the standardized DSC method based on the first heat melting point characteristics (ASTM E 928-1). For this purpose, we chose two PDO monomers and two glycolide monomers of different purities. For CC method, the procedures described in Examples 1 and 2 were used.

For ASTM E 928-1 method, the exact steps written in the protocol were followed. As mentioned earlier, the measurements of monomer purity by DSC using ASTM method is based on the depression of the melting point and change of melting profile. The advantage of this method is that one does not need to know the chemical identity of the impurity, as long as the impurity form a eutectic mixture with the major component (for example, the DSC ASTM purity method would not measure sand or other "inert" particles). However, there are some important limitations of the DSC purity method that will be emphasized in this study. A graphical illustration of the ASTM E 928-1 method is given in FIGS. 7 and 8 for glycolide monomers 20 and 17, respectively.

The glycolide Monomer-20 made by one-step distillation process produced multiple failed batches with low IV, slow conversion, and bad crystallization rates despite acceptable free acid value of 1.8 mEq/kg. On the other hand, glycolide Monomer-17 was made by a two-step distillation process and produced repeatedly high molecular weight polymers with good monomer conversion rate.

The summary of the comparative study on these two glycolide monomers is presented in Table 4. Based on DSC ASTM E 928-1 method illustrated in FIGS. 7 and 8, there is no indication of different purity levels for the two glycolide monomers. Based on this method, glycolide monomers 17 and 20 showed very high purity levels of 99.95 and 99.96%, respectively. However, the crystallization-based method of this invention (CC method) generated very different results for these two monomers. Data in Table 4 obtained from CC method clearly suggest very high purity of glycolide monomer-17 (Tc=59.9° C., and ΔHc=102.5 J/g), but in contrast, very low purity of glycolide monomer-20 (Tc=29.8° C., and ΔHc=91.8 J/g). This observation agrees very well with polymerization performance of these two materials.

TABLE 4

Purity comparison of two glycolide lots using a standard,
melting point-based DSC method (ASTME 928-1)

| Monomer ID | Comments | Non-Inventive, ASTM method E 928-1 Purity (mole %) | Inventive, CC Method Parameters | | | |
|---|---|---|---|---|---|---|
| | | | Tc (° C.) | Standard Deviation (n = 5) | ΔHc (J/g) | Standard Deviation (n = 5) |
| Gly Monomer-17 | Made by 2-step distillation; yield high Mw polymers | 99.95 | 59.9 | 5.4 | 102.5 | 6.5 |
| Gly Monomer-20 | Made by 1-step distillation; yield lower Mw polymers | 99.96 | 29.8 | 1.6 | 91.8 | 1.3 |

We believe that the DSC test method E 928-1 is not sensitive enough to detect low level impurities in lactone monomers, which may cause great damage during polymerization. The same conclusion was reached in the case of the comparative study on two PDO monomers of different purity. The summary of this comparative study on PDO monomer-29 and PDO monomer-30 is presented in Table 5.

TABLE 5

Purity comparison of two PDO monomer lots using a standard, first heat/melting
point-based DSC method (ASTM E 928-1), and the method of the present invention

| Monomer ID | Non-Inventive, DS-TMD-23389 Free Acid (mEq/kg) | Non-Inventive, TM403-066 Test Egg IV (dL/g) | Non-Inventive, ASTM method E 928-1 Purity (mole %) | Inventive, CC Method Parameters | | | |
|---|---|---|---|---|---|---|---|
| | | | | Tc (° C.) | Standard Deviation (n = 5) | Tc (° C.) | Standard Deviation (n = 5) |
| PDO Monomer-29 | 3.3 | 2.2 | 99.62 | −5.97 | 1.5 | 120.7 | 2.5 |
| PDO Monomer-30 | 0.7 | 2.9 | 99.28 | 0.37 | 3.2 | 129.5 | 3.0 |

In addition to ASTM E 928-1 method and inventive CC method data, corresponding results from free acid (DS-TMD-23389) and Test Egg IV (TM403-066) measurements are included in Table 4, as well. Based on ASTM E 928-1 method, the PDO monomer-29 showed higher purity (99.62%) than the PDO monomer-30 (99.28%). However, inventive, crystallization-based CC method showed opposite results: PDO monomer-30 exhibited higher crystallization temperature (0.37° C.), and higher enthalpy of crystallization (129.5 J/g) than the PDO monomer-29 (−5.97° C. and 120.7° C., respectively). These data are strongly supported by the corresponding free acid and Test Egg IV measurements. PDO monomer-29 has higher free acid content (3.3 mEq/kg), and lower Test Egg IV (2.2 dL/g) than the PDO monomer-30 (0.7 mEq/kg and 2.9 dL/g, respectively).

We believe that in the case of purity evaluation of PDO monomers, DSC ASTM E 928-1 method failed because it is based on the first heat melting peak measurements, which is strongly dependent on monomers' thermal history. Since PDO monomers melt at relatively low temperatures (around 30° C.), it is possible that a sample in DSC pan could be exposed to temperatures close to its melting point. In that case, a partial melting of PDO sample may occur prematurely, thus affecting the DSC ASTM E 928-1 measurements. In contrast, our inventive, crystallization-based CC method is independent on thermal history of the sample (pre-melting is required), so an ambient exposure, or monomers' processing conditions would not matter.

Example 5. The Effect of Moisture, Ambient Exposure on the Inventive Calorimetric Crystallization Method for Evaluating Purity of p-Dioxanone, PDO Monomers This example will provide data to support moisture independent nature of the crystallization-based CC method of the present invention.

During purity determination of PDO monomers by Ethicon's validated Test Egg IV measurements (TM403-066), particularly at its polymerization stage, it is critical to avoid ambient exposure and to perform all steps under a strict inert atmosphere. Even a slight level of moisture picked up from air could act as an initiator and open the lactone ring that starts the polymerization. Higher number of chain ends would artificially lower the IV of the Test Egg polymers produced, and thus compromise the purity evaluation. Keeping samples dry is particularly important for PDO monomers, because of the presence of an ether group in their chemical structure, which makes them extremely hydrophilic.

To prove that the crystallization-based CC method of the present invention is not moisture sensitive, we designed the following experiment. A high purity PDO monomer, PDO Monomer-8 was tested first by CC method by taking the dry sample immediately from the 25-ml glass vial (exposure time=0 min). After taking the samples for this initial measurement (0 min), the cap on the 25-ml vial was removed and the monomer was exposed to following ambient conditions: 72° F. with 30% relative humidity. After 10 minutes of exposure, the second set of CC method measurement was conducted, followed by the third set exactly 60 minutes after the cap was removed. After 60 minutes of exposure the sample felt sticky, indicating that a lot of moisture was picked up from the air. Eventually, the absorbed moisture will start degradation of monomer, generating the free acids and oligomers, but in the timeframe of this experiment (about 60 minutes) no notable level degradation is expected to occur. The summary of PDO Monomer-8 purity evaluation with the moisture effect by CC method is given in Table 6.

TABLE 6

Moisture exposure study on PDO Monomer-8 using the method of the present invention (CC method with temperature of crystallization, Tc, onset of crystallization, and enthalpy of crystallization, ΔHc), as a function of different ambient exposure time (30% relative humidity and 72° F.).

| Monomer ID | Comments | Tc (° C.) | Standard Deviation (n = 5) | Onset Cryst. (° C.) | Standard Deviation (n = 5) | ΔHc (J/g) | Standard Deviation (n = 5) |
|---|---|---|---|---|---|---|---|
| PDO Monomer-8-0 min | No exposure; exp. started immediately | 6.34 | 1.0 | −4.63 | 1.0 | 130.7 | 4.2 |
| PDO Monomer-8-10 min | Vial with monomer opened for 10 minutes | 6.84 | 1.9 | −4.94 | 0.9 | 127.4 | 4.8 |
| PDO Monomer-8-60 min | Vial with monomer opened for 60 minutes | 6.54 | 2.6 | −4.74 | 0.9 | 118.7 | 7.3 |

The data in Table 6 indicate that the location of crystallization peak, Tc, and onset of crystallization practically do not change for all samples, including the "sticky", moisture rich 60-minute sample. However, this sample exhibited lower enthalpy of crystallization (around 119 J/g) compared to other time points. This may be due to an error induced on analytical balance by measuring the weight of the sample, since the absorbed water contributes to the overall weight of the sample, but not to the heat (enthalpy) of crystallization value. On the other hand, the location of crystallization peak, Tc, and onset of crystallization are not affected by the weight of sample, so these parameters should provide accurate monomer purity evaluation.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims.

I claim:

1. A method for on-line evaluation of monomer formulation purity comprising the steps of:
   a) raising the temperature of the monomer formulation having a defined melting point to a first elevated temperature at least 20° C. above a preset melting point for a selected monomer formulation;
   b) cooling the monomer formulation at a controlled cooling rate in the range from about 0.5 to 50° C. per minute;
   c) measuring at least one critical property selected from the group consisting of a) crystallization peak temperature at the onset of crystallization, b) an area under the crystallization peak, which represents the heat or enthalpy of crystallization, ΔHc and combinations thereof;
   d) comparing the at least one of the selected critical properties measures relative to such properties for standard setting monomer formulations; and
   e) estimating the purity of the sample monomer formulation, wherein lower values for the temperature of the crystallization peak temperature or a smaller crystallization peak area, each relative to the standard values for corresponding standard setting monomer formulation, indicates a higher presence of impurities relative to the standard setting monomer formulation.

2. A method according to claim 1, wherein the monomer formulation comprises cyclic lactone monomeric or oligomeric units.

3. A method according to claim 2, wherein the cyclic monomeric units are selected from the group consisting of lactide, glycolide, para-dioxanone, lactone, caprolactone and mixtures thereof.

4. A method according to claim 1, wherein the monomer formulation is cooled in controlled fashion using differential scanning calorimetry.

5. A method according to claim 1, wherein the method includes in measuring step c) only of measuring the onset of crystallization.

6. A method according to claim 1, wherein the method includes in measuring step c) only a measurement of the area under the crystallization peak.

7. A method for the adjustment and preparation of polymeric compositions from a selected monomeric formulation comprising:
   a. estimating of the purity of the monomer formulation according to claim 1; and
   b. adjusting an initiator concentration to limit degradation and the number of chain ends and to increase the molecular weight of the resulting polymeric composition.

8. A method according to claim 7 wherein the estimated purity of monomer formulation is low (high concentration of impurities), and the pre-reaction initiator concentration is adjusted lower relative to a standard pre-reaction initiator concentration for high purity monomer reaction formulations.

9. A method for the adjustment and preparation of polymeric compositions from a selected monomeric formulation comprising:
   a. estimating the purity of the selected monomer formulation according to claim 1; and b. extending a polymerization time in reaction vessel to increase overall polymeric conversion.

10. A method according to claim 9 wherein the polymerization time is increased due to an estimate of low purity for the selected monomer formulation.

11. A method for the adjustment and preparation of polymeric compositions from a selected monomeric formulation comprising:
   a. estimating the purity estimation of the selected monomer formulation according to claim 1; and
   b. conducting additional purification steps to remove excess impurities.

12. A method according to claim 11 wherein the additional purification steps is by recrystallization of the monomer formulation from a solvent.

13. A method for the manufacture of polymer compositions from a selected monomer formulation comprising:
   a. evaluating the monomer purity by a method comprising the steps of:
   a1) raising the temperature of the monomer formulation having a defined melting point to a first elevated temperature at least 20° C. above a preset melting point for a selected monomer formulation;
   a2) cooling the monomer formulation at a controlled cooling rate in the range from about 0.5 to 50° C. per minute;
   a3) measuring at least one critical property selected from the group consisting of a) crystallization peak temperature at the onset of crystallization, b) an area under the crystallization peak, which represents the heat or enthalpy of crystallization, ΔHc and combinations thereof;
   a4) comparing the at least one of the selected critical properties measures relative to such properties for standard setting monomer formulations; and
   a5) estimating the purity of the sample monomer formulation, wherein lower values for the temperature of the crystallization peak temperature or a smaller crystallization peak area, each relative to the standard values for corresponding standard setting monomer formulation, indicates a higher presence of impurities relative to the standard setting monomer formulation, and
   b. adjusting the polymerization conditions according to claims 7, 9 or 11 and then
   c. polymerizing the selected monomer formulation, optionally as adjusted, in a reaction vessel to form a reacted polymeric formulation;
   d. discharging the reacted polymeric formulation from the reaction vessel; and
   e. drying the reaction product to remove unreacted monomer from a polymer resin, and optionally,
   f. characterizing the dry, reacted polymeric composition.

14. A method of manufacture according to claim 13 wherein the polymerization is conducted as a melt, as a solid-state, or in the presence of solvent.

15. A method of manufacture according to claim 13 wherein the polymerization is done as a melt.

16. A method of manufacture according to claim 13 wherein monomer conversion is monitored remotely within the polymer reactor in situ, in real-time by near-infrared, Raman, and Fourier Transform Near-infrared (FT-NIR) spectroscopy.

17. A non-calorimetric method for on-line evaluation of monomer formulation purity comprising the steps of:
   a. raising the temperature of the monomer formulation having a defined melting point to a first elevated temperature at least 20° C. above a preset melting point for a selected monomer formulation;
   b. cooling the monomer formulation at a controlled cooling rate in the range from about 0.5 to 50° C. per minute;
   c. detecting the onset of crystallization temperature, or the temperature where the phase transition from liquid to solid state occurs;
   d. comparing the onset of crystallization, or the phase transition from liquid to solid state relative to such properties for standard setting monomer formulations; and
   e. estimating the purity of the sample monomer formulation, wherein lower values for the onset of crystallization, or the phase transition from liquid to solid state each relative to the standard values for corresponding standard setting monomer formulation, indicates a higher presence of impurities relative to the standard setting monomer formulation.

18. Detecting the onset of crystallization temperature, or the temperature where the phase transition from liquid to solid state occurs in the method of claim 17 by non-calorimetric methods selected from the group consisting of light scattering, density or volume measurements, dynamic mechanical analysis, turbidity and combinations thereof.

* * * * *